(12) United States Patent
Surnilla et al.

(10) Patent No.: US 9,482,152 B2
(45) Date of Patent: Nov. 1, 2016

(54) MULTI-STROKE VARIABLE DISPLACEMENT ENGINE

(71) Applicant: Ford Global Technologies, LLC, Dearborn, MI (US)

(72) Inventors: Gopichandra Surnilla, West Bloomfield, MI (US); John Ottavio Michelini, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 126 days.

(21) Appl. No.: 14/279,150

(22) Filed: May 15, 2014

(65) Prior Publication Data

US 2014/0248995 A1   Sep. 4, 2014

Related U.S. Application Data

(60) Continuation of application No. 13/964,950, filed on Aug. 12, 2013, now Pat. No. 8,727,943, which is a division of application No. 13/162,441, filed on Jun. 16, 2011, now Pat. No. 8,523,739, which is a continuation of application No. 12/175,205, filed on Jul. 17, 2008, now Pat. No. 7,963,267.

(51) Int. Cl.
| *F02D 41/02* | (2006.01) |
| *F02B 69/06* | (2006.01) |
| *B60W 10/06* | (2006.01) |
| *B60W 10/11* | (2012.01) |
| *B60W 30/188* | (2012.01) |
| *F02D 41/00* | (2006.01) |
| *F02D 41/30* | (2006.01) |

(52) U.S. Cl.
CPC ............. *F02B 69/06* (2013.01); *B60W 10/06* (2013.01); *B60W 10/11* (2013.01); *B60W 30/188* (2013.01); *F02D 41/0087* (2013.01); *F02D 41/3058* (2013.01); *B60W 2510/06* (2013.01); *F02D 2400/02* (2013.01); *F02D 2400/04* (2013.01); *Y10T 477/675* (2015.01); *Y10T 477/677* (2015.01); *Y10T 477/679* (2015.01); *Y10T 477/68* (2015.01)

(58) Field of Classification Search
CPC ..................................................... F02D 41/023
See application file for complete search history.

(56) References Cited

U.S. PATENT DOCUMENTS

| 5,022,353 A | 6/1991 | Kamamura |
| 5,119,696 A | 6/1992 | Yamaguchi |
| 5,158,044 A | 10/1992 | Kawamura |

(Continued)

FOREIGN PATENT DOCUMENTS

JP    4246601 B2    4/2009

OTHER PUBLICATIONS

Partial Translation of Office Action of Chinese Application No. 2009101651278, Issued May 6, 2013, State Intellectual Property Office of PRC, 8 Pages.

*Primary Examiner* — Tisha Lewis
(74) *Attorney, Agent, or Firm* — Julia Voutyras; Alleman Hall McCoy Russell & Tuttle LLP

(57) ABSTRACT

A vehicle propulsion system and method of operation are presented. As one example, cylinder deactivation and transitioning from four to two strokes is coordinated with transmission shifting to improve vehicle response. Additionally, it is possible to reduce transitions in operating modes to improve drive feel.

15 Claims, 6 Drawing Sheets

(56) References Cited

U.S. PATENT DOCUMENTS

| | | |
|---|---|---|
| 5,369,581 A | 11/1994 | Ohsuga et al. |
| 5,433,676 A | 7/1995 | Abe et al. |
| 5,827,150 A | 10/1998 | Mukumoto |
| 6,257,176 B1 | 7/2001 | Shimasaki et al. |
| 6,363,907 B1 | 4/2002 | Arai et al. |
| 6,619,241 B2 | 9/2003 | Otterspeer et al. |
| 6,971,338 B2 | 12/2005 | Kobayashi et al. |
| 7,036,465 B2 | 5/2006 | Burk et al. |
| 7,059,997 B2 | 6/2006 | Nishizawa et al. |
| 7,072,758 B2 | 7/2006 | Kolmanovsky et al. |
| 7,082,898 B2 | 8/2006 | Kitamura et al. |
| 7,128,048 B2 | 10/2006 | Yamoaka et al. |
| 7,128,687 B2 | 10/2006 | Lewis |
| 7,963,267 B2 | 6/2011 | Surnilla et al. |
| 8,096,920 B2 | 1/2012 | Surnilla et al. |
| 8,133,153 B2 | 3/2012 | Surnilla et al. |
| 8,197,383 B2 | 6/2012 | Surnilla |
| 2005/0205063 A1 | 9/2005 | Kolmanovsky et al. |
| 2008/0146412 A1 | 6/2008 | Sagawa et al. |

MULTI-STROKE VARIABLE DISPLACEMENT ENGINE

CROSS REFERENCE TO RELATED APPLICATIONS

The present application is continuation of U.S. patent application Ser. No. 13/964,950, "MULTI-STROKE VARIABLE DISPLACEMENT ENGINE," filed Aug. 12, 2013, which is a divisional of U.S. patent application Ser. No. 13/162,441, "MULTI-STROKE VARIABLE DISPLACEMENT ENGINE," filed Jun. 16, 2011, now U.S. Pat. No. 8,523,739, which is a continuation of U.S. patent application Ser. No. 12/175,205, "MULTI-STROKE VARIABLE DISPLACEMENT ENGINE," filed Jul. 17, 2008, now U.S. Pat. No. 7,963,267, the entire contents of each of which are hereby incorporated by reference for all purposes.

BACKGROUND AND SUMMARY

Some vehicles include engines that may be partially deactivated to increase the fuel efficiency by reducing the effective displacement of the engine during select operating conditions. As such, some engines may be referred to as having a variable displacement capability, whereby combustion in one or more cylinders of the engine may be temporarily deactivated or discontinued while other cylinders of the engine continue to carry out combustion. Where increased engine output is requested by the vehicle operator, the deactivated cylinders may be activated by once again performing combustion to thereby increase the effective engine displacement and provide the requested engine output to the vehicle operator.

The inventors of the present disclosure have recognized a disadvantage with the above approach. As one example, the inventors have recognized that during some conditions the above approach may result in frequent transitions from a deactivated state of the cylinders to an activated state where combustion is performed. These transitions may increase noise, vibration, and harshness (NVH) of the engine that may be perceived by the vehicle operator. Additionally, fuel efficiency may be reduced where frequent transitions between active and deactivated states are performed by the engine. As such, engines having this variable displacement capability may exhibit only limited fuel efficiency improvements while perceived drivability of the vehicle from an operator's perspective may be reduced.

As a non-limiting example, at least some of the above issues may be addressed by a method of operating a vehicle propulsion system, comprising: operating an engine to produce an engine output; transferring the engine output to one or more drive wheels via a transmission; responsive to a first condition, varying torque supplied to the drive wheels by adjusting a relative number of combusting cylinders and deactivated cylinders of the engine; and responsive to a second condition, varying the torque supplied to the drive wheels by adjusting a number of strokes performed by the combusting cylinders per combustion cycle while shifting the transmission between different gear ratios.

Since the power density of the engine may be increased by transitioning the engine from the four stroke cycle to the two stroke cycle, the vehicle operator's requested engine output may be met while maintaining the deactivated cylinders in the deactivated state rather than initiating combustion in the deactivated cylinders. Additionally, coordination of engine operation with the transmission state may enable further reduction in the number of transitions between active and deactivated cylinder states.

DETAILED DESCRIPTION

Figure 1:
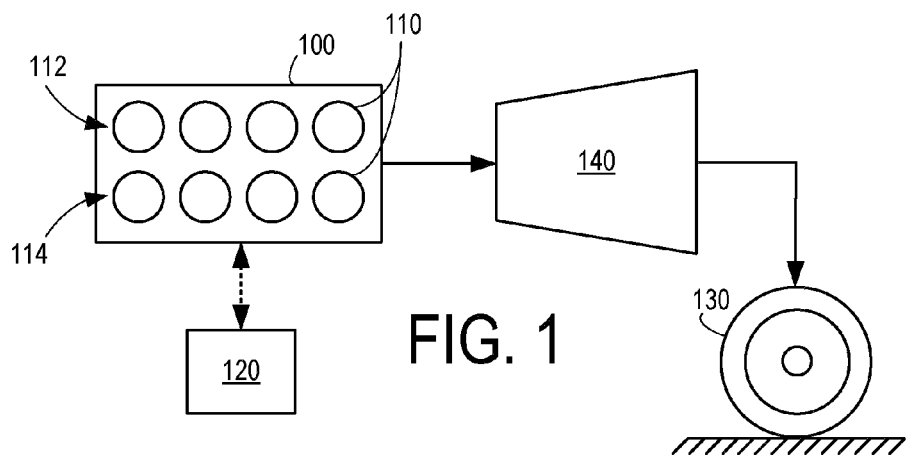
FIG. 1 illustrates an example multi-stroke variable displacement internal combustion engine arranged in a vehicle propulsion system.

FIG. 1 illustrates a multi-stroke variable displacement internal combustion engine 100. Engine 100 may include one or more combustion chambers or cylinders 110, a non-limiting example of which is depicted schematically in FIG. 6. In some embodiments, engine 100 may be configured as a component of a vehicle propulsion system. For example, engine 100 may be operatively coupled with one or more drive wheels indicated schematically at 130 via a transmission 140. In other embodiments, engine 100 may be configured as a component of a power generation system, and may be optionally coupled with an electrical generation device such an electric machine.

Transmission 140 may include a plurality of selectable gear ratios. As will be described in the context of FIGS. 7 and 8, the transmission may be transitioned between two or more of these gear ratios responsive to the particular operating mode of the engine. For example, at least some of the engine cylinders may include multi-stroke cylinders, which are configured to selectively carry out a multi-stroke operation. A multi-stroke operation may include adjusting a number of strokes performed by the multi-stroke cylinder per cycle. As a non-limiting example, a multi-stroke cylinder may be operated in a four stroke cycle under some conditions and may be operated in a two stroke cycle under other conditions.

At least some of the engine cylinders may include variable displacement cylinders, which are configured to selectively carry out a deactivation operation. A deactivation operation may include discontinuing combustion of air and fuel within the deactivated variable displacement cylinder for one or more cycles. While the variable displacement cylinders are in a deactivated state, other cylinders of the engine, such as the multi-stroke cylinders may continue to carry out combustion, thereby enabling the engine to be operated with a reduced effective displacement.

FIG. 1 illustrates a non-limiting example where engine 100 includes a total of eight cylinders. Note that engine 100 may include other suitable number of cylinders in other embodiments, including 2, 3, 4, 5, 6, 10, or 12 cylinders. A first cylinder group, indicated at 112, includes four multi-stroke cylinders that may selectively operated to carry out a multi-stroke operation. A second cylinder group, indicated at 114, includes four variable displacement cylinders that may be selectively operated to carry out a deactivation operation. In other examples, the first cylinder group and the second cylinder group may include more or less cylinders than the particular embodiment described with reference to FIG. 1.

A control system 120 may be operatively and communicatively coupled with engine 100 as well as transmission 140, drive wheel 130, and other suitable components of the vehicle. Control system 120 may be configured to cause the multi-stroke cylinders of first cylinder group 112 to carry out the multi-stroke operation and may be configured to cause the variable displacement cylinders of second cylinder group 114 to carry out the deactivation operation under select operating conditions.

Figure 2:
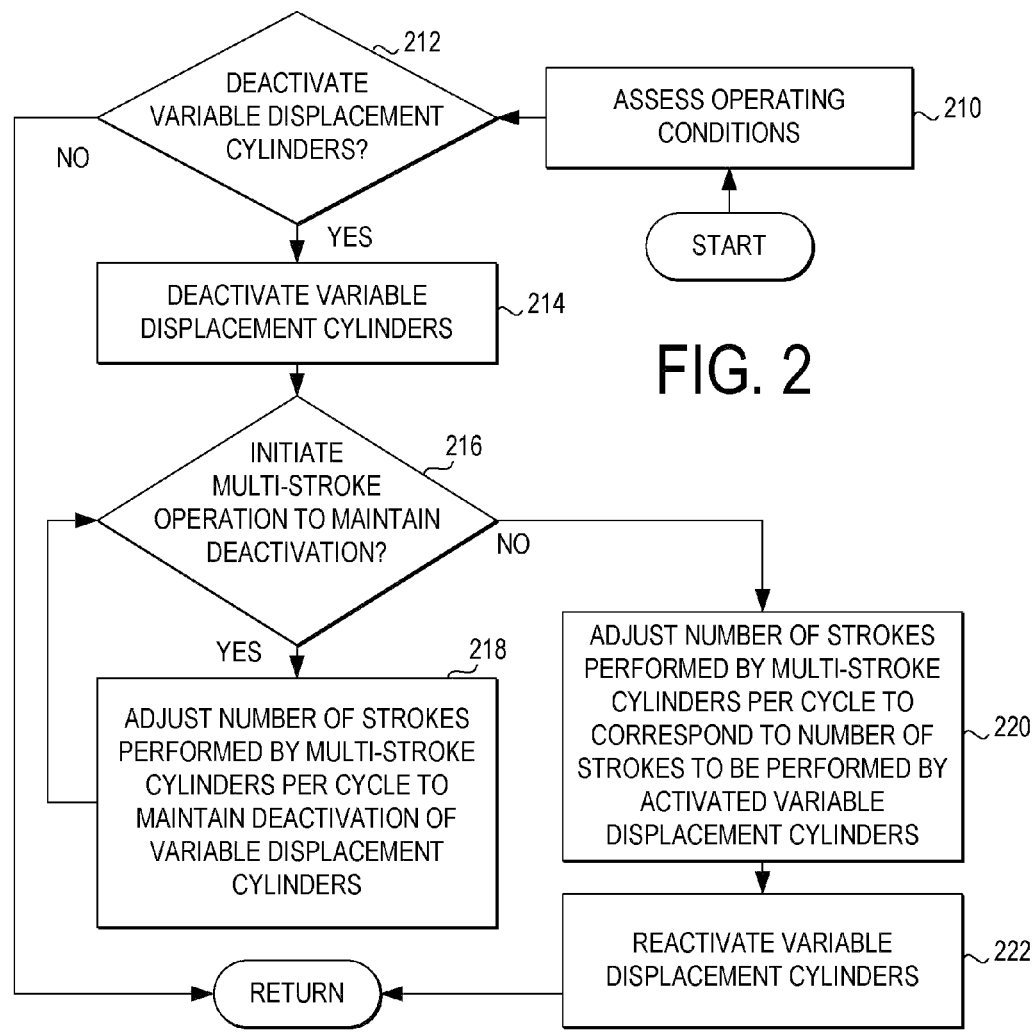
FIG. 2 illustrates a flow chart depicting an example process flow that may be used to control the engine of FIG. 1.

FIG. 2 illustrates a flow chart depicting an example process flow that may be performed by control system 120. At 210 one or more operating conditions may be assessed by the control system. These operating conditions may include engine speed, engine load, an indication of an operator requested engine output (e.g. as requested by the vehicle operator or user), an indication of an operator requested engine speed (e.g. as requested by the vehicle operator or user), ambient conditions such as air temperature, humidity and pressure, vehicle speed, transmission state, an indication of engine NVH, and other suitable operating conditions described with reference to FIG. 6.

At 212, it may be judged whether the variable displacement cylinders are to be deactivated. For example, the engine may be initially operating with all of the cylinders carrying out combustion in a four stroke cycle. To identify whether the variable displacement cylinders are to be deactivated, the control system may reference any suitable function, look-up table, or map in response to the operating conditions assessed at 210.

Figure 3:
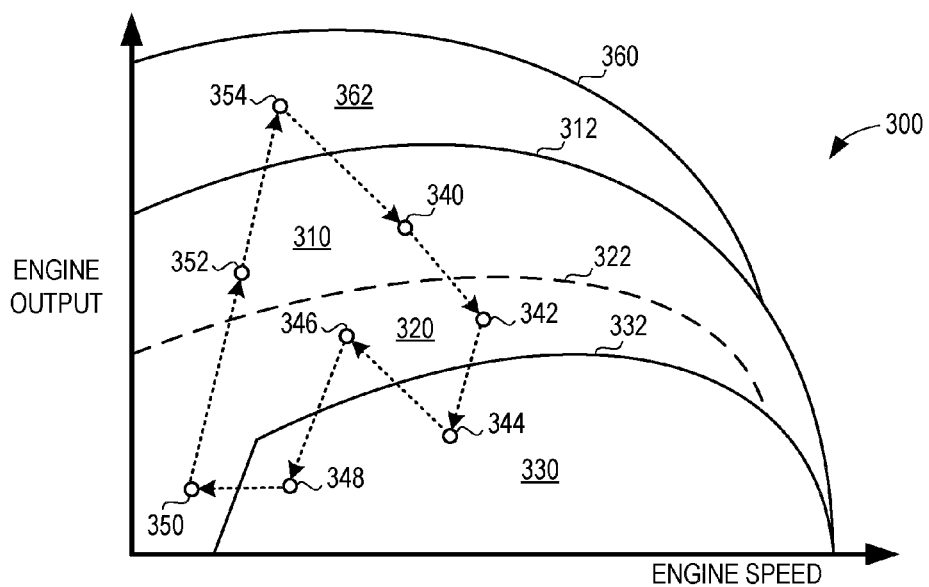
FIG. 3 depicts an example map that may be used by the control system to control the engine of FIG. 1 in accordance with the process flow of FIG. 2.

A non-limiting example, map 300, which is depicted in FIG. 3, may be referenced from memory by the control system. The horizontal axis of map 300 indicates a first operating condition such as engine speed and vertical axis of map 300 indicates a second operating condition such as engine output. Other suitable operating conditions may be represented by the map in other examples. The engine output may refer to an engine torque or engine power that is produced by the engine or which is requested by the vehicle operator. Map 300 further illustrates at least three different operating regions in this particular example. A first operating region 310 is bounded by line 312, line 332, the horizontal axis, and the vertical axis. A second operating region 320 is bounded by line 322, line 332, the horizontal axis, and the vertical axis. As such, region 320 may at least partially overlap with region 310. A third operating region 330 is bounded by line 332 and the horizontal axis. Therefore, line 332 may define the boundary of operating regions 310 and 330 during at least some conditions.

In this particular example, operating region 310 corresponds to an engine mode where all of the engine cylinders are operated in the four stroke cycle. An example operating point 340 is depicted within region 310 where the engine may be initially operated with all of its cylinders carrying out combustion in the four stroke cycle. By contrast, operating region 330 may correspond to an engine mode where the multi-stroke cylinders are operated in the four stroke cycle and the variable displacement cylinders are operated in a deactivated state. Since less than all of the cylinders may be carrying out combustion while the engine is operating within operating region 330, operating region 330 may be constrained to a region of map 300 of relatively lower engine output than operating region 310 as depicted in FIG. 3. Further, operating region 330 may also be constrained to higher engine speeds, since deactivation of some of the engine cylinders at lower engine speeds may result in unacceptable levels of noise, vibration, and harshness (NVH), particularly where the active cylinders are operating in a four stroke cycle while other cylinders are deactivated.

As the engine proceeds from operating point 340 to 342, the engine may continue carrying out combustion with all of its cylinders operating in the four stroke cycle, even though operating point 342 is also within operating region 320. As will be described in the context of the subsequent operating points, operating region 320 may correspond to a hysteresis band that exhibits path dependence, which enables the engine to pass directly from operating region 310 to operating region 330 without operating in the mode dictated by operating region 320.

However, as the engine continues to proceed from operating point 342 to operating point 344, the control system may judge the answer at 212 to be yes and the process flow may proceed to 214. At 214, the variable displacement cylinders may be deactivated by the control system. In some embodiments, to deactivate the cylinders, the control system may perform one or more of the following operations: discontinue fueling of the variable displacement cylinders, discontinue spark ignition at the variable displacement cylinders, and cause the intake and/or exhaust valves of the variable displacement cylinder to be held in a closed position.

While the variable displacement cylinders are deactivated, the multi-stroke cylinders may continue to carry out combustion in the four stroke cycle, thereby producing an engine output that may be used to propel the vehicle. The fuel consumed by the multi-stroke cylinders and the resulting engine output that the active cylinders produce while the variable displacement cylinders are deactivated may be substantially less than the engine output that may be produced when all of the cylinders are carrying out combustion in the four stroke cycle. Therefore, fuel efficiency may be increased by deactivating some of the engine cylinders when the engine output and/or engine speed are within prescribed operating regions, such as region 330.

Alternatively, where the engine remains within operating region 310, the answer at 212 may be judged no, and the process flow may return. As another example, where the engine is diagnosed by the control system as having a defect that does not permit effective operation of the engine with the variable displacement cylinders deactivated, the answer at 212 may be judged no and all of the engine cylinders may continue to carry out combustion, thereby avoiding the cylinder deactivation operation.

From 214, the process flow may proceed to 216. At 216 it may be judged whether to initiate a multi-stroke operation to maintain operation of the variable displacement cylinders in the deactivated state. For example, as the engine proceeds to operating point 346 from operating point 344 the control system may judge whether the number of strokes performed by the multi-stroke cylinders may be adjusted to increase or decrease the engine output, thereby permitting the continued deactivation of the variable displacement cylinders.

In some embodiments, the control system may be configured to judge the answer at 216 to be no when the multi-stroke cylinders are diagnosed by the control system as having a defect that does not permit the number of strokes performed by the multi-stroke cylinders to be adjusted by the control system. Otherwise, the answer at 216 may be judged yes in response to operating conditions that place the engine's operating point within region 320, including an indication of a requested increase in engine output, engine speed, change in transmission state, etc.

If the control system judges the answer at 216 to be yes, the process flow may proceed to 218. At 218, the control system may adjust the number of strokes performed by the multi-stroke cylinders per cycle to maintain the variable displacement cylinders in the deactivated state.

As a first example, the control system may reduce the number of strokes performed by the multi-stroke cylinders per cycle to enable a further increase of engine output without activating the currently deactivated variable displacement cylinders. For example, the control system may transition the multi-stroke cylinders from the four stroke cycle to a two stroke cycle while the variable displacement cylinders maintain the deactivated state. This operation may be performed at operating point 346 within operating region 320, for example. Since the multi-stroke cylinders are transitioned to the two stroke cycle, the engine output may be increased due to the increased combustion frequency and power density of these cylinders operating in the two stroke cycle as compared to the four stroke cycle.

As a second example, the control system may increase the number of strokes performed by the multi-stroke cylinders per cycle to enable a reduction of the engine output. For example, where the engine is operating at operating point 346 with the multi-stroke cylinders carrying out combustion in the two stroke cycle and the variable displacement cylinders are deactivated, the control system may increase the number of strokes performed by the multi-stroke cylinders in response to a reduction or requested reduction in the engine output where the engine proceeds to operating point 348 from 346. For example, the control system may transition the multi-stroke cylinders from the two stroke cycle to the four stroke cycle to reduce the engine output, while maintaining the variable displacement cylinders in the deactivated state.

The control system may also adjust the number of strokes performed by the multi-stroke cylinders in response to engine speed changes while the variable displacement cylinders are deactivated. For example, from operating point 348, the engine may proceed to operating point 350. As a non-limiting example, operating point 350 may refer to an idle state of the engine. As operating point 350 is no longer within operating region 330, the multi-stroke cylinders may be transitioned from the four stroke cycle to the two stroke cycle to perform engine idle with reduced NVH as compared to operation in the four stroke cycle while the variable displacement cylinders are deactivated. Operation of the active engine cylinders in the two stroke cycle as opposed to the four stroke cycle may enable the engine lug limit to be reduced by approximately half, thereby enabling the engine to be operated at a lower idle speed.

As the engine proceeds to operating point 352, the control system may judge the answer at 216 to be no and the process flow may proceed to 220. At 220, the number of strokes performed by the multi-stroke cylinders per cycle may be adjusted to correspond to the number of strokes to be performed by the variable displacement cylinders upon their activation. For example, the control system may transition the multi-stroke cylinders from the two stroke cycle performed at operating point 350 to the four stroke cycle. In coordination with this transition, the control system may activate the variable displacement cylinders at 222. For example, the variable displacement cylinders may be activated in the four stroke cycle as the multi-stroke cylinders are transitioned to the four stroke cycle. In this way, the engine may be again operated at operating point 352 with all of the engine cylinders carrying out combustion in the four stroke cycle. From 222, the routine may return.

In some embodiments, the control system may consider the rate of change of the engine output and/or engine speed when judging whether to initiate the multi-stroke operation to maintain the variable displacement cylinders in the deactivated state. For example, as the engine is proceeding from operating point 348 to 352, the engine may transition directly to a mode where all the cylinders are operated in the four stroke cycle rather than transitioning the multi-stroke cylinders to the two stroke cycle while maintaining the variable displacement cylinders in the deactivated state. In this way, the number of transitions may be reduced. As such, the hysteresis band provided by operating region 320 may be rate dependent with regards to one or more of the operating conditions assessed at 210.

Furthermore, in some embodiments, the engine may optionally include an additional mode of operation that is defined by operating region 362. Operating region 362 is bounded in this example by line 360, line 312, and the horizontal axis. Region 362 may refer to an operating mode where all of the engine cylinders are carrying out combustion in a two stroke cycle. For example, where the engine proceeds to operating point 354 from operating point 352, the control system may transition all of the engine cylinders to a two stroke cycle from a four stroke cycle, thereby increasing the power density and combustion frequency of the engine. As such, the engine output may be increased as compared to the previously described modes of operation.

As the engine proceeds from operating point 354 to an operating point that is again within operating region 310, the control system may transition the engine cylinders from the two stroke cycle to the four stroke cycle, thereby permitting a further reduction of the engine output. In this way, the engine may be transitioned between the two stroke cycle and the four stroke cycle in response to changes in operating conditions, while all cylinders are carrying out combustion. As such, it should be appreciated that the variable displacement cylinders may also be configured as multi-stroke cylinders. In other words, the variable displacement cylinders may be deactivated under some conditions and may be transitioned between two and four stroke cycles during other conditions.

Figure 4:
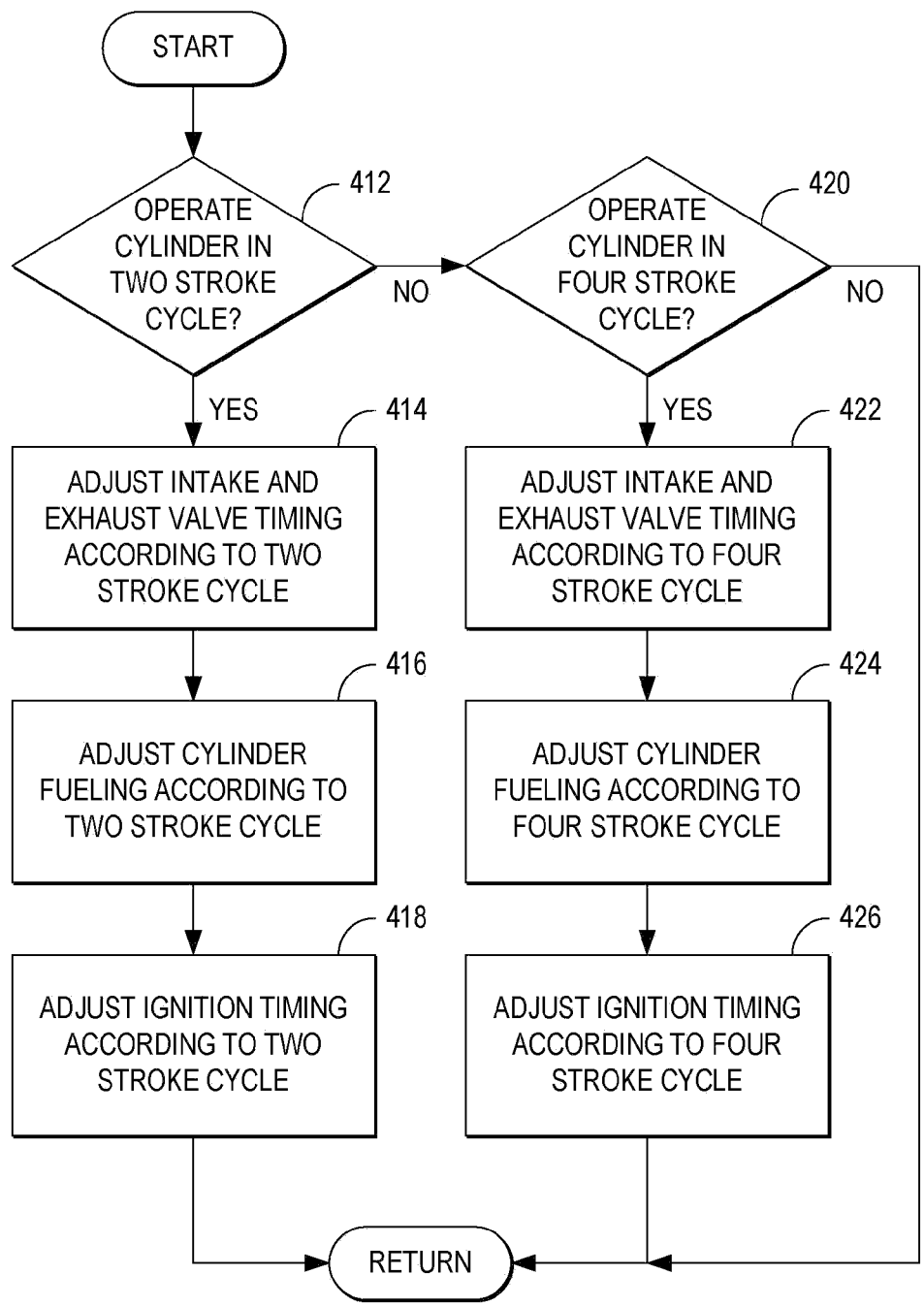
FIG. 4 illustrates a flow chart depicting an example process flow that may be used to control the engine of FIG. 1.

FIG. 4 illustrates a flow chart depicting an example process flow that may be performed by the control system to transition the multi-stroke cylinders between a two stroke cycle and a four stroke cycle. At 412 it may be judged whether to operate a cylinder (e.g. a multi-stroke cylinder) in the two stroke cycle in accordance with the process flow of FIG. 2. If the answer at 412 is yes, the control system may adjust one or more of the cylinder's intake and/or exhaust valve timing at 414, the cylinder fueling at 416, and the ignition timing at 418 according to the two stroke cycle.

Alternatively, if the answer at 412 is judged no, the process flow may proceed to 420 where it may be judged whether to operate the cylinder in the four stroke cycle in accordance with the process flow of FIG. 2. If the answer at 420 is yes, the process flow may adjust one or more of the cylinder's intake and/or exhaust valve timing at 422, the cylinder fueling at 416, and the ignition timing at 418 according to the four stroke cycle. Furthermore, in some embodiments, throttle position may be adjusted in response to the particular operating mode of the engine to vary intake airflow supplied to the cylinders that are carrying out combustion.

Figure 5A:
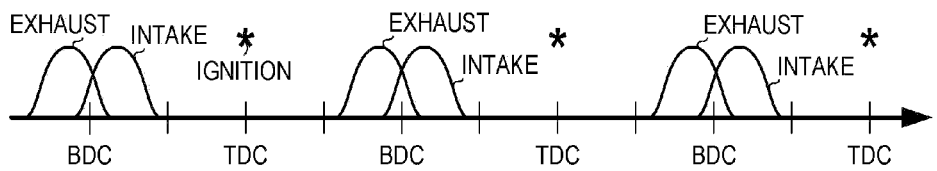
FIGS. 5A and 5B show example timelines depicting operation of an engine cylinder in a two stroke cycle and a four stroke cycle, respectively.
Figure 5B:
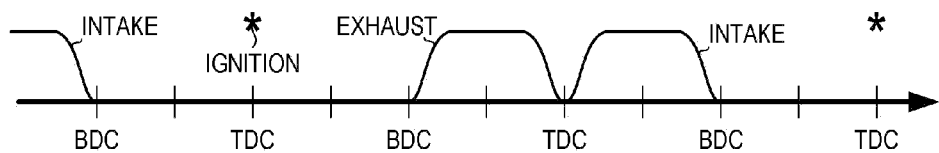

Referring also to FIGS. 5A and 5B, timing diagrams are depicted for an example cylinder operating in a two stroke cycle and a four stroke cycle, respectively. An indication of time is provided along the horizontal axes of FIGS. 5A and 5B with reference to piston position. Top dead center (TDC) and bottom dead center (BDC) represent the piston position relative to the cylinder as it reciprocates throughout operation of the engine. A comparison of FIGS. 5A and 5B illustrates how the intake and exhaust valves of the cylinder may be opened twice as often in the two stroke cycle as the four stroke cycle. Further, fuel may be delivered to the engine at twice the frequency during the two stroke cycle as the during the four stroke cycle. For example, the cylinder may be fueled approximately every 360 crank angle degrees during the two stroke cycle and approximately every 720 degrees during the four stroke cycle. Further still, ignition of the air and fuel charge within the cylinder may be performed around each TDC (e.g. approximately every 360 crank angle degrees) in the two stroke cycle, and may be performed around every other TDC in the four stroke cycle (e.g. approximately every 720 crank angle degrees).

Figure 6:
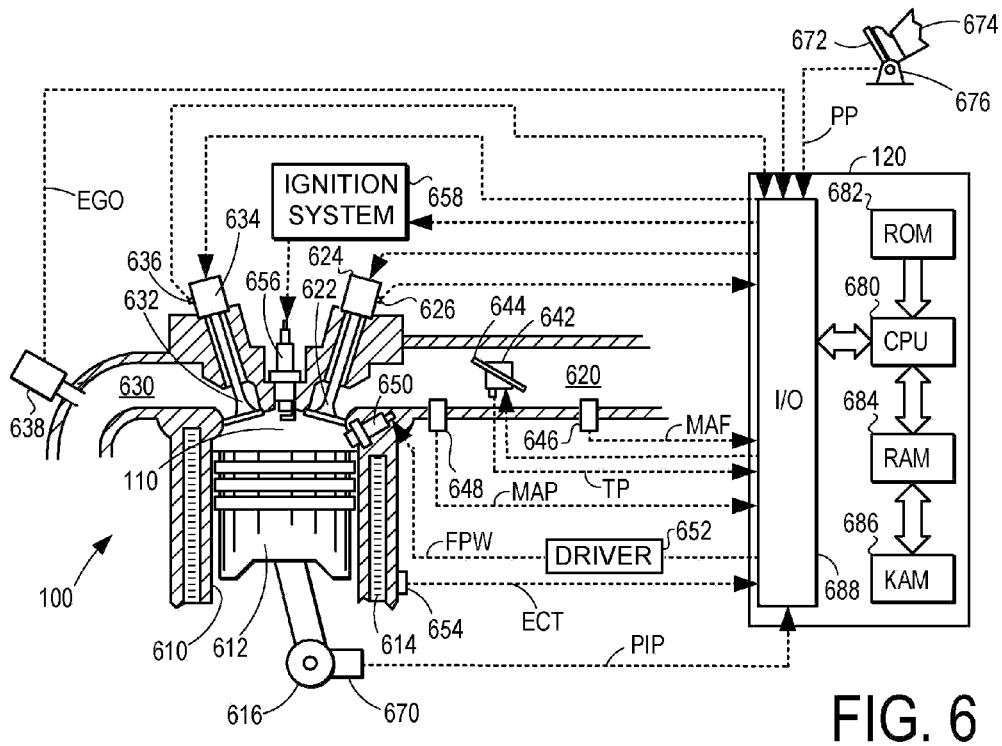
FIG. 6 depicts a detailed view of an example engine cylinder.

FIG. 6 illustrates a schematic depiction of an example cylinder 110 of engine 100 including the intake and exhaust system components that interface with the cylinder. Note that cylinder 110 may correspond to one or more of the previously described variable displacement cylinder and multi-stroke cylinder. Cylinder 110 is at least partially defined by combustion chamber walls 610 and piston 612. Piston 612 may be coupled to a crankshaft 616 via a crank arm, along with other pistons of the engine. Crankshaft 616 may be operatively coupled with drive wheel 130 via transmission 140 as depicted in FIG. 1.

Cylinder 110 may receive intake air via an intake passage 620. Intake passage 620 may also communicate with other cylinders of engine 100. Intake passage 620 may include a throttle 642 including a throttle plate 644 that may be adjusted by control system 120 to vary the flow of intake air that is provided to the engine cylinders. Cylinder 110 can communicate with intake passage 620 via one or more intake valves 622. As a non-limiting example, these intake valves may be configured as intake poppet valves that are arranged near the top or upper region of cylinder 110. However, in other embodiments, these intake valves may be arranged in a lower region of the cylinder.

Cylinder 110 may exhaust products of combustion via an exhaust passage 630. Cylinder 110 can communicate with exhaust passage 630 via one or more exhaust valves 632. As a non-limiting example, these exhaust valves may be configured as exhaust poppet valves that are arranged near the top or upper region of cylinder 110.

In some embodiments, cylinder 110 may optionally include a spark plug 656, which may be actuated by an ignition system 658. A fuel injector 650 may be provided in the cylinder to deliver fuel directly thereto. However, in other embodiments, the fuel injector may be arranged within intake passage 620 upstream of intake valve 622. Fuel injector 650 may be actuated by a driver 652.

A non-limiting example of control system 120 is depicted schematically in FIG. 6. Control system 120 may include a processing subsystem (CPU) 680, which may include one or more processors. CPU 680 may communicate with memory, including one or more of read-only memory (ROM) 682, random-access memory (RAM) 684, and keep-alive memory (KAM) 686. As a non-limiting example, this memory may stored operating condition information as well as the process flows described herein.

CPU 680 can communicate with various sensors and actuators of engine 100 via an input/output device 688. As a non-limiting example, these sensors may provide operating condition information to the control system, and may include: an indication of mass airflow (MAF) through intake passage 620 via sensor 646, an indication of manifold air pressure (MAP) via sensor 648, an indication of throttle position (TP) via throttle 642, an indication of engine coolant temperature (ECT) via sensor 654 which may communicate with coolant passage 614, an indication of engine speed (PIP) via sensor 670, an indication of exhaust gas oxygen content (EGO) via sensor 638, an indication of a request or input (PP) from vehicle operator 674 via position sensor 676 of pedal 672, an indication of intake valve position via sensor 626, and an indication of exhaust valve position via sensor 636, among others.

Furthermore, the control system may control operation of the engine 100, including cylinder 110 via one or more of the following actuators: driver 652 to vary fuel injection timing and quantity, ignition system 658 to vary spark timing, intake valve actuator 624 to vary intake valve timing, exhaust valve actuator 634 to vary exhaust valve timing, and throttle 642 to vary the position of throttle plate 644, among others. Note that intake and exhaust valve actuators 624 and 634 may include electromagnetic valve actuators (EVA) and/or cam-follower based actuators. Further, it should be appreciated that the intake and/or exhaust valve actuators may include other suitable hardware that enables the valves to be deactivated (e.g. held closed) while the cylinder is deactivated.

Figure 7:
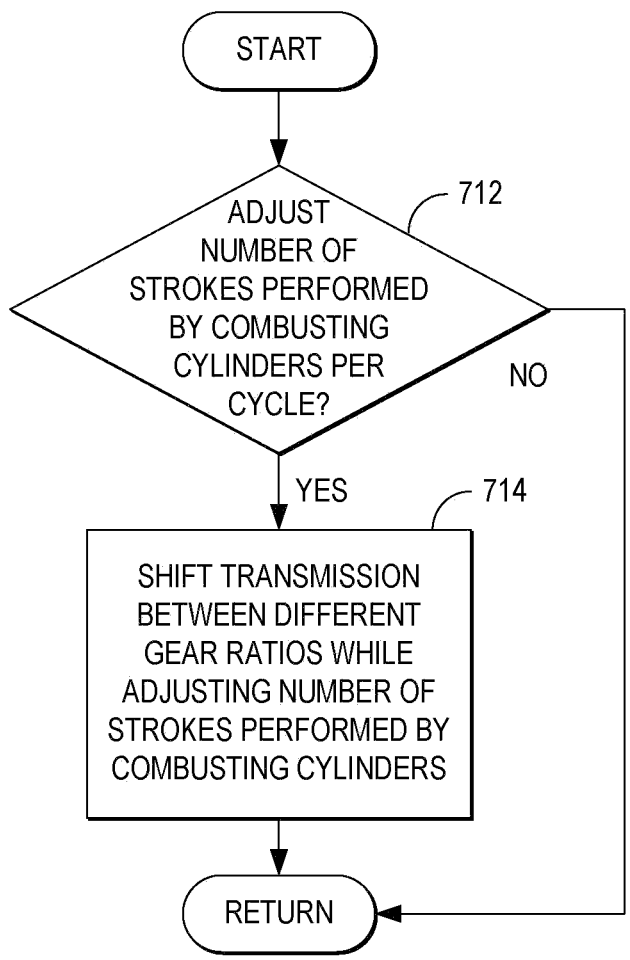
FIG. 7 illustrates a process flow depicting an example control strategy.

FIG. 7 is a process flow depicting an example control strategy for the vehicle propulsion system of FIG. 1. At 712, the control system may judge whether the number of strokes performed by the combusting cylinders are to be adjusted. For example, the control system may refer to the process flow of FIGS. 2 and 3 as previously described. If the answer at 712 is judged no, the process flow may return. If the answer at 712 is judge yes, the process flow may proceed to 714. At 714, the control system may shift the transmission between different gear ratios while adjusting the number of strokes performed by the combusting cylinders. As will be described in the context of an example transmission shift schedule of FIG. 8, the gear ratio of the transmission may be adjusted differently depending on the adjustment to the number of strokes performed by the combusting cylinders.

Figure 8:
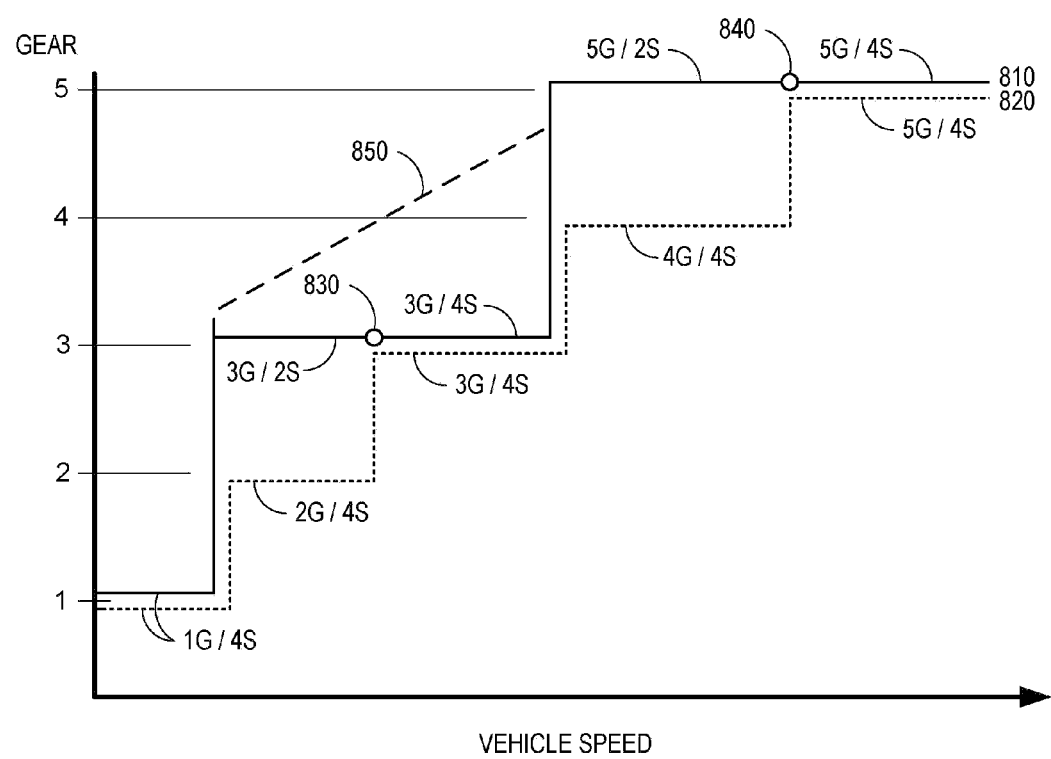
FIG. 8 illustrates an example transmission shift schedule.

FIG. 8 depicts example transmission shift schedules 810 and 820. A first shift schedule for the engine selectively operated in the two stroke mode and the four stroke mode is depicted at 810 as a solid line. The second shift schedule for the engine operating in only the four stroke mode is depicted at 820 as a broken line.

At lower vehicle speeds, the combusting cylinders of the engine may be operated in the four stroke mode (4S) while the first gear transmission gear (1G) is selected. At higher vehicle speeds, the transmission may be up-shifted (e.g. gear ratio may be reduced). As illustrated by line 820, the transmission may be up-shifted to a second gear (2G) while the combusting cylinders of the engine continue to operate in the four stroke cycle. By contrast, line 810 illustrates how a transition to the two stroke mode can enable the transmission to be up-shifted to a greater extent while delivering the same or similar level of wheel torque at a given engine rotational speed.

For example, the transmission may be up-shifted to third gear (3G) rather than second gear (2G) since the engine has sufficient torque reserve when operating in two stroke mode to enable the second gear (2G) to be optionally skipped. Therefore, by reducing the number of strokes carried out by the combusting cylinders of the engine per combustion cycle in coordination with an up-shift, an intermediate gear of the transmission may be optionally eliminated or omitted, thereby reducing the cost, weight, and complexity of the transmission as well as reducing the number of shifts that are performed by the transmission during an acceleration event.

For example, if the engine is instead operated with a constant number of strokes per combustion event (e.g. instead varying the relative number of combusting cylinders and deactivated cylinders), such as with reference to the four stroke cycle depicted by line 820, intermediate transmission gears may be utilized to provide the requested wheel torque across a range of vehicle speeds. Line 820 further depicts how the transmission may be up-shifted to third gear (3G) at even higher speeds while the four stroke operation is maintained. By contrast, operating point 830 depicts how the engine may be transitioned once again from the two stroke mode to the four stroke mode for operation at higher engine rotational speeds.

Line 850 illustrates how engine rotational speed may vary in proportion to vehicle speed across a selected gear ratio such as 3G. As a non-limiting example, operating point 830 may represent the lug limit of the engine operating in the four stroke cycle, or may represent the shift point that is at an engine rotational speed that is greater than the lug limit of the engine while operating in the four stroke cycle. As depicted by line 850, the engine may be operated in the two stroke mode at lower engine rotational speeds and may be operated in the four stroke mode at higher engine rotational speeds.

At even higher engine rotational speeds, transition of the engine from the four stroke mode (4S) to the two stroke mode (2S) depicted by line 810 can enable the transmission to proceed directly from third gear (3G) to fifth gear (5G), thereby skipping fourth gear. Upon reduction of the gear ratio from 3G to 5G, the engine speed may be reduced and two stroke mode may be performed. Since the engine is able to produce greater engine torque in the two stroke mode than the four stroke mode (for the same number of combusting cylinders), the engine can still deliver the requested wheel torque even when greater reduction in the gear ratio are performed as a consequence of the up-shift.

By contrast, line 820 depicts how the four stroke engine utilizes an up-shift to an intermediate fourth gear (4G) before up-shifting again to the fifth gear (5G) in order to deliver the requested wheel torque across the vehicle speed range. As shown at operating point 840 of line 810, the combusting cylinders of the engine may be transitioned once again from the two stroke mode (2S) to the four stroke mode (4S) while maintaining the transmission state in fifth gear.

As can be demonstrated by FIG. 8, the vehicle speed may be increased by shifting the transmission differently depending on whether the engine is transitioned between the two stroke and four stroke modes or whether the engine maintains the four stroke mode (e.g. and instead optionally deactivates or activates cylinders of the engine). The multi-stroke operation provided by the transitions between four stroke and two stroke cycles enables a reduction in the number of shifts performed by the transmission (e.g. by skipping intermediate gears), and may optionally enable at least some of the intermediate gears to be eliminated or omitted from the transmission.

In some embodiments, these intermediate gears may be retained in the transmission so that adjustments to the number of combusting cylinders (e.g. using a VDE approach) can still provide the requested wheel torque across the entire range of vehicle speeds by utilizes the intermediate gears as described with reference to line 820.

The vehicle speed may be reduced in a similar manner as described above with reference to the vehicle speed increase. As one example, where the vehicle is initially operating at higher speeds, the combusting cylinders of the engine may be transitioned to the two stroke mode from the four stroke mode as the engine approaches its lug limit in the four stroke mode, rather than performing a down-shift. For example, where the engine is initially operating in the four stroke cycle (4S) and the transmission is in fifth gear (5G), the propulsion system can respond to a reduction in vehicle speed by transitioning the engine to the two stroke cycle as indicated by line 810 at 840. By contrast, line 820 depicts how the engine operating in the four stroke mode may utilize a down-shift of the transmission as indicated by the transition from fifth gear (5G) to fourth gear (4G).

Note that where the intermediate gears are retained in the transmission, the engine may be optionally operated in a four stroke mode during deceleration of the vehicle in order to increase fuel efficiency, whereby the intermediate gears are used to maintain the engine rotational speed within the lug limits and over speed limits of the four stroke mode.

FIG. 8 further depicts how the transmission may be shifted between a lower gear ratio and a higher gear ratio in response to a change of an operating condition, such as vehicle speed, engine rotational speed, transmission state, or operator requested engine torque as indicated by accelerator pedal position, and/or whether VDE or multi-stroke operation is employed. Furthermore, FIG. 8 depicts how the number of strokes performed by the engine per combustion cycle may be increased during a shift of the transmission from the lower gear ratio to the higher gear ratio; and the number of strokes performed by the engine per combustion cycle may be reduced during a shift of the transmission from the lower gear ratio to the higher gear ratio.

Note that the example control and estimation process flows included herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle having an engine coupled to a transmission, comprising:
    during a first condition, transitioning from a four-stroke cycle to a two-stroke cycle during a transmission shift from a lower gear to a higher gear, skipping an intermediate gear therebetween; and
    during a second condition, transitioning from the lower gear to the intermediate gear, and then to the higher gear, while maintaining the four-stroke cycle throughout, the engine coupled to the transmission and an electrical generation device.

2. The method of claim 1, wherein vehicle speed increases during each of the first and second conditions.

3. The method of claim 2, wherein the engine is a direct injection engine.

4. The method of claim 1, further comprising, during the first condition, additionally transitioning from the two-stroke cycle to the four-stroke cycle as vehicle speed increases while in the higher gear.

5. The method of claim 4, wherein in the second condition, the shift from the intermediate gear to the higher gear occurs at a lower vehicle speed than the transition from the two-stroke cycle to the four-stroke cycle in the higher gear of the first condition.

6. A method for a vehicle having an engine coupled to a transmission, comprising:
    during a first condition, transitioning from a four-stroke cycle to a two-stroke cycle during a transmission shift from a lower gear to a higher gear, skipping an intermediate gear therebetween, as vehicle speed increases; and
    during a second condition, transitioning from the lower gear to the intermediate gear, and then to the higher gear, while maintaining the four-stroke cycle throughout, as vehicle speed increases, the engine coupled to the transmission and an electrical generation device.

7. The method of claim 6, wherein the transmission has at least five distinct gears.

8. The method of claim 7, wherein the engine is a direct injection engine.

9. The method of claim 6, further comprising, during the first condition, additionally transitioning from the two-stroke cycle to the four-stroke cycle as the vehicle speed increases while in the higher gear.

10. The method of claim 9, wherein in the second condition, the shift from the intermediate gear to the higher gear occurs at a lower vehicle speed than the transition from the two-stroke cycle to the four-stroke cycle in the higher gear of the first condition.

11. A method for a vehicle having an engine coupled to a transmission, comprising:
    during a first condition, transitioning from a two-stroke cycle to a four-stroke cycle while maintaining a lower gear, and then transitioning from the four-stroke cycle to the two-stroke cycle during a transmission shift from the lower gear to a higher gear, skipping an intermediate gear therebetween, as vehicle speed increases; and
    during a second condition, transitioning from an even lower gear to the lower gear, and then to the intermediate gear, and then to the higher gear, while maintaining the four-stroke cycle throughout, as vehicle speed increases, the engine coupled to the transmission and an electrical generation device.

12. The method of claim 11, wherein the transmission has at least five distinct gears.

13. The method of claim 12, wherein the engine is a direct injection engine.

14. The method of claim 11, further comprising, during the first condition, additionally transitioning from the two-stroke cycle to the four-stroke cycle as the vehicle speed increases while in the higher gear.

15. The method of claim 14, wherein in the second condition, the shift from the intermediate gear to the higher gear occurs at a lower vehicle speed than the transition from the two-stroke cycle to the four-stroke cycle in the higher gear of the first condition.

* * * * *